(12) United States Patent
Kurehashi et al.

(10) Patent No.: US 12,190,729 B2
(45) Date of Patent: Jan. 7, 2025

(54) CONTROL APPARATUS, MOVABLE OBJECT, CONTROL METHOD, AND COMPUTER READABLE STORAGE MEDIUM

(71) Applicant: HONDA MOTOR CO.,LTD., Tokyo (JP)

(72) Inventors: Takahiro Kurehashi, Saitama (JP); Shigeru Inoue, Saitama (JP); Moriya Horiuchi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 17/835,929

(22) Filed: Jun. 8, 2022

(65) Prior Publication Data
US 2022/0406179 A1 Dec. 22, 2022

(30) Foreign Application Priority Data

Jun. 22, 2021 (JP) .................. 2021-103632

(51) Int. Cl.
*B60W 30/09* (2012.01)
*G08G 1/0967* (2006.01)
(Continued)

(52) U.S. Cl.
CPC ....... *G08G 1/096708* (2013.01); *B60W 30/09* (2013.01); *G08G 1/16* (2013.01); *B60W 2556/45* (2020.02); *G06V 20/56* (2022.01)

(58) Field of Classification Search
CPC .......... G08G 1/166; G08G 1/162; G08G 1/04; G08G 1/005; G08G 1/096725;
(Continued)

(56) References Cited

U.S. PATENT DOCUMENTS

2011/0090093 A1* 4/2011 Grimm .................. G08G 1/162
340/901
2013/0060400 A1* 3/2013 Hahne .................... G08G 1/161
701/1
(Continued)

FOREIGN PATENT DOCUMENTS

CN 110248311 A 9/2019
CN 110430401 A 11/2019
(Continued)

OTHER PUBLICATIONS

Office Action issued for counterpart Chinese Application 202210472805.0, issued by The State Intellectual Property Office of People's Republic of China on Jun. 14, 2023.

*Primary Examiner* — Stephen Holwerda

(57) ABSTRACT

A control apparatus includes a reception control unit configured to perform control to receive, when a movable object is located at a first point, presence information of a risk area including a plurality of position coordinates specified through image recognition by another movable object, a determination unit configured to determine whether the movable object is in a vicinity of the risk area based on the plurality of position coordinates included in the presence information of the risk area for which the reception control unit has performed the control to receive, a transmission control unit configured to perform control to transmit, when the determination unit determines that the movable object is in the vicinity of the risk area, information related to presence of the movable object, and a control unit configured to execute control of the movable object.

20 Claims, 7 Drawing Sheets

(51) Int. Cl.
*G08G 1/16* (2006.01)
*G06V 20/56* (2022.01)

(58) Field of Classification Search
CPC .... G08G 1/164; G08G 1/096708; G08G 1/16; G08G 1/167; G08G 1/0133; G08G 1/163; H04W 4/12; H04W 4/90; H04W 4/029; H04W 4/40; H04W 4/021; H04W 4/06; B60W 40/04; B60W 50/14; B60W 2554/4041; B60W 2554/4029; B60W 2420/403; B60W 30/09; B60W 2556/50; B60W 2050/143; B60W 2556/10; B60W 2556/65; B60W 2556/45; B60W 2556/05; B60W 30/0956; B60W 30/0953; B60W 2554/4042; B60W 2050/146; B60W 2554/20; B60W 2050/0064; B60W 2554/406; B60W 2756/10; G06V 20/54; G06V 20/52; G06V 20/58; G06V 20/56

See application file for complete search history.

(56) References Cited

U.S. PATENT DOCUMENTS

| | | | | |
|---|---|---|---|---|
| 2013/0201036 A1* | 8/2013 | Stählin | ............... | G08G 1/161 340/944 |
| 2014/0009275 A1* | 1/2014 | Bowers | ............... | G06Q 20/145 340/436 |
| 2014/0051346 A1* | 2/2014 | Li | ............... | H04W 4/46 455/3.01 |
| 2014/0191884 A1* | 7/2014 | Maeda | ............... | H04W 4/40 340/944 |
| 2014/0324330 A1* | 10/2014 | Minemura | ............... | G08G 1/166 701/300 |
| 2015/0035685 A1* | 2/2015 | Strickland | ............... | B60Q 9/008 340/901 |
| 2017/0018187 A1* | 1/2017 | Kim | ............... | G08G 1/005 |
| 2017/0132481 A1 | 5/2017 | Sato | | |
| 2018/0129888 A1* | 5/2018 | Schubert | ............... | G06T 11/20 |
| 2018/0295474 A1* | 10/2018 | Lee | ............... | G08G 1/093 |
| 2019/0139329 A1 | 5/2019 | Uchida | | |
| 2020/0118442 A1 | 4/2020 | Iihoshi | | |
| 2020/0180638 A1 | 6/2020 | Kanoh | | |
| 2020/0406747 A1* | 12/2020 | Sakai | ............... | G08G 1/167 |
| 2021/0114588 A1 | 4/2021 | Komuro | | |

FOREIGN PATENT DOCUMENTS

| | | |
|---|---|---|
| CN | 110678912 A | 1/2020 |
| CN | 110799401 A | 2/2020 |
| CN | 111402631 A | 7/2020 |
| CN | 112677966 A | 4/2021 |
| CN | 112991715 A | 6/2021 |
| JP | 2017091093 A | 5/2017 |
| JP | 2020102822 A | 7/2020 |
| TW | 201805907 A | 2/2018 |

\* cited by examiner

CONTROL APPARATUS, MOVABLE OBJECT, CONTROL METHOD, AND COMPUTER READABLE STORAGE MEDIUM

The contents of the following Japanese patent application(s) are incorporated herein by reference:
NO. 2021-103632 filed on Jun. 22, 2021

BACKGROUND

1. Technical Field

The present invention relates to a control apparatus, a movable object, a control method, and a computer readable storage medium.

2. Related Art

Patent document 1 describes that based on position information of a plurality of movable objects located in a distribution area, a following movable object that travels behind a movable object having sensed a dangerous event in the distribution area is selected and decided as a movable object corresponding to a unicast transmission target via a base transceiver station for mobile communication.

PRIOR ART DOCUMENT

Patent document 1: Japanese Patent Application Publication NO. 2020-102822

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
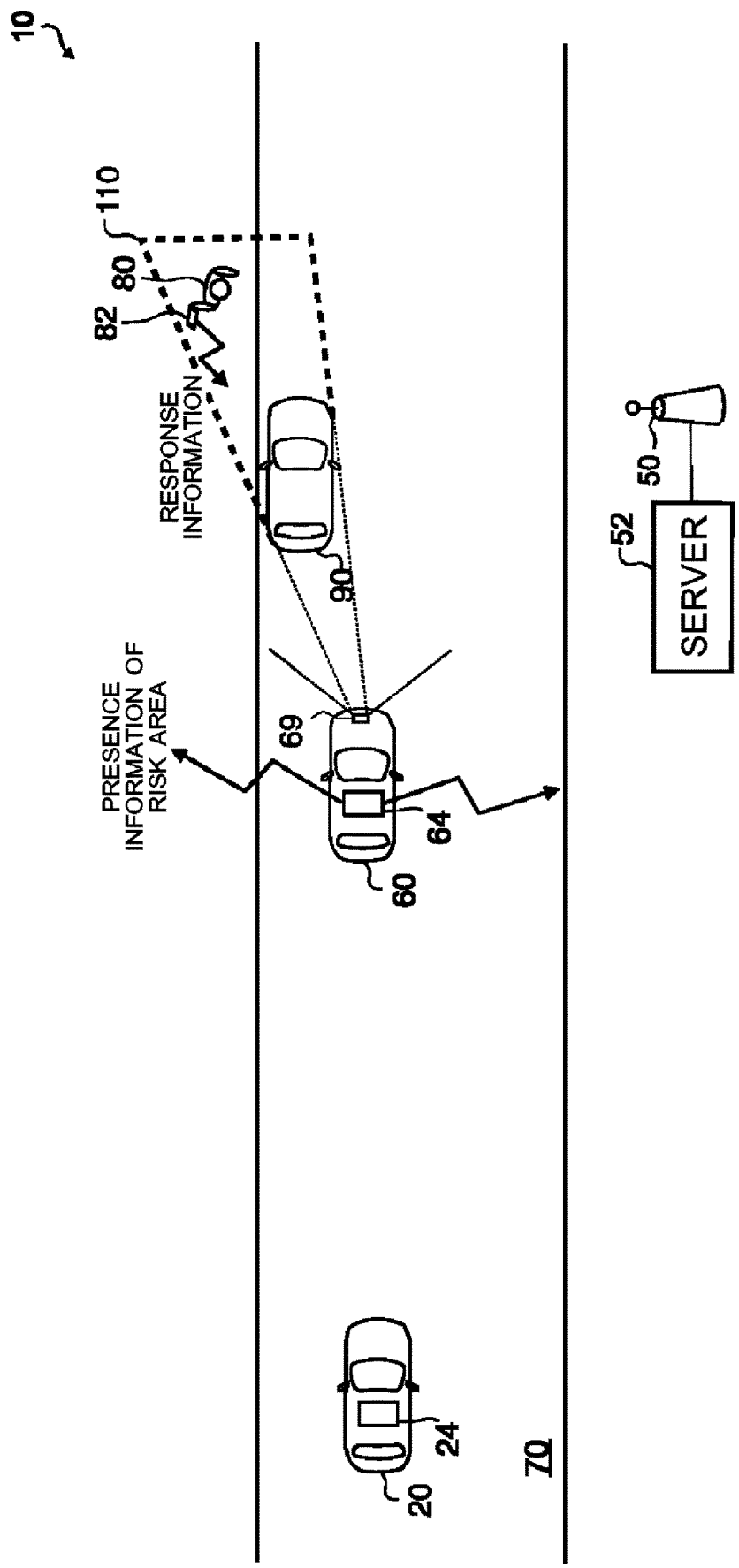
FIG. 1 generally illustrates a usage scene of a warning system 10.

FIG. 1 generally illustrates a usage scene of a warning system 10. The warning system 10 includes a vehicle 20, a vehicle 60, a terminal 82, a base transceiver station 50, and a server 52.

The vehicle 20 and the vehicle 60 are one example of a movable object. The vehicle 20 includes a control apparatus 24. The control apparatus 24 includes a communication function. The vehicle 60 includes a sensor 69 and a control apparatus 64. The sensor 69 is configured by including a camera. The control apparatus 64 includes a processing function of information obtained by the sensor 69, and a communication function.

The terminal 82 is a terminal possessed by a pedestrian 80. The terminal 82 is, for example, a mobile terminal such as a smartphone. The base transceiver station 50 is a base transceiver station for mobile communication. The server 52 is a server connected to the base transceiver station 50. The server 52 may include, for example, an edge computing server such as an MEC server.

In FIG. 1, the vehicle 20 and the vehicle 60 are vehicles travelling along a road 70. A vehicle 90 is a vehicle parked on the road 70. The vehicle 60 travels in a same advancing direction as the vehicle 20 ahead of the vehicle 20.

For the vehicle 60, an area 110 on an advancing direction side of the vehicle 60 in front of the parked vehicle 90 is an area where it is difficult to visually recognized from a position of the vehicle 60. The control apparatus 64 is configured to detect the area 110 that is not on a line of sight from the vehicle 60 as a risk area from an image in the advancing direction which is obtained by the sensor 69. The control apparatus 64 transmits presence information of the risk area including position information of the area 110 by broadcast using a wireless signal.

When the presence information of the risk area which is transmitted from the control apparatus 64 is received, in a case where a current position of the terminal 82 is in the risk area, the terminal 82 is configured to output warning information through a human machine interface (HMI) function of the terminal 82. In addition, as response information to the presence information, the terminal 82 transmits response information including a current position of the terminal 82 using a wireless signal. When the response information is received from the terminal 82, the control apparatus 64 of the vehicle 60 determines that the current position of the terminal 82 is in the risk area to output a warning through the HMI function of the control apparatus 64 and also perform travelling assistance of the vehicle 60.

When the presence information of the risk area which is transmitted from the control apparatus 64 is received, the control apparatus 24 of the vehicle 20 stores position information of the area 110 which is included in the presence information. The control apparatus 24 determines whether the vehicle 20 has reached a position close to the area 110 stored by the control apparatus 24 during a predetermined period since the presence information of the risk area is received.

Figure 2:
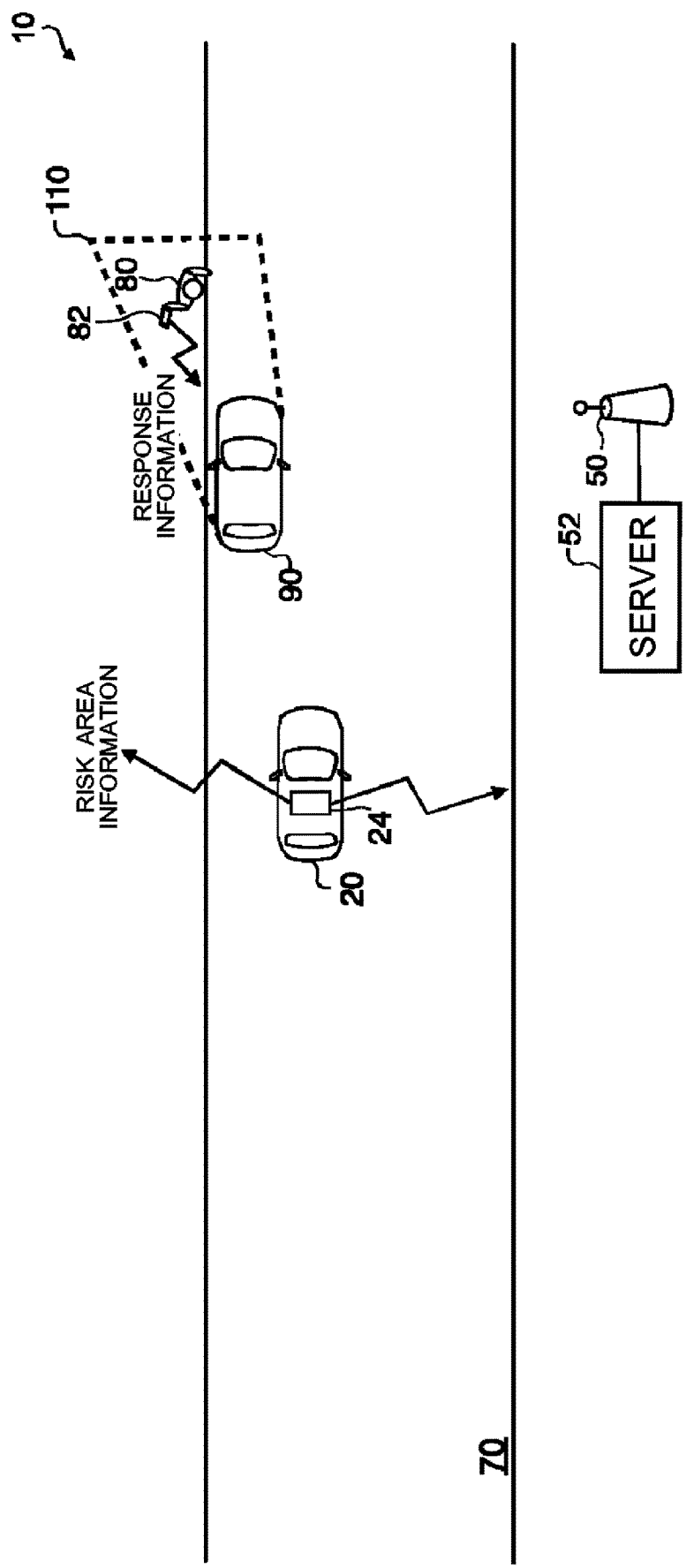
FIG. 2 illustrates a state when a vehicle 20 has reached a position close to an area 110.

FIG. 2 illustrates a state when the vehicle 20 has reached a position close to the area 110. When the vehicle 20 reaches a position in front of the position of the area 110 by a predetermined distance, the control apparatus 24 transmits risk area information including the stored position information of the area 110 by broadcasting using a wireless signal. When the risk area information transmitted from the control apparatus 24 is received, in a case where the current position of the terminal 82 is in the risk area, the terminal 82 outputs warning information through the human machine interface (HMI) function of the terminal 82. In addition, as response information to the risk area information, the terminal 82 transmits response information including the current position of the terminal 82 using a wireless signal. When the response information is received from the terminal 82, the control apparatus 24 determines that the current position of the terminal 82 is in the risk area to output a warning through the HMI function of the control apparatus 24 and also perform travelling assistance of the vehicle 20.

It should be noted that the server 52 manages current position information of the vehicle 60 and current position information of the vehicle 20 which are periodically transmitted from the control apparatus 64 and the control apparatus 24. When the presence information of the risk area which is transmitted from the control apparatus 64 of the vehicle 60 is received, the server 52 stores the position information of the area 110 which is included in the presence information. In addition, the server 52 specifies the vehicle 20 travelling behind the vehicle 60 that has transmitted the presence information, and transmits the presence information including the position information of the area 110 to the vehicle 20. Thus, the control apparatus 24 can obtain the presence information of the risk area from the server 52. For this reason, when the vehicle 60 transmits the presence information, even in a case where the vehicle 20 is travelling in a position where it is not possible to receive the presence information transmitted from the control apparatus 64, the control apparatus 24 can receive the presence information from the server 52 before reaching a position close to the area 110.

In this manner, the control apparatus 24 can receive and store the position information of the risk area from the other vehicle 60 or the server 52 in advance, and can transmit the risk area information when the vehicle 20 reaches a position close to the risk area. With this configuration, even when the control apparatus 24 does not have a function of recognizing the risk area by sensing means such as a camera, the control apparatus 24 can output the warning to the terminal 82 or perform the travelling assistance of the vehicle 20 by using the risk area received from the other vehicle 60 or the server 52 through the wireless communication function. In addition, even when the pedestrian 80 is not walking in the risk area at timing at which the vehicle 60 has transmitted the presence information of the risk area, there is a possibility that the pedestrian 80 is walking in the risk area at timing at which the following vehicle 20 has reached a position close to the risk area. In accordance with the warning system 10, in a case where the pedestrian 80 is present in the risk area at timing at which the vehicle 20 has reached a position close to the risk area, the terminal 82 of the pedestrian 80 can be caused to perform the warning output, and also the travelling assistance of the vehicle 20 can be performed. It should be noted that according to the present embodiment, the risk area may be a recognition of a state related to an external environment recognized by the vehicle 20 or the control apparatus 24. The risk area may be, for example, an area where there is a risk for the pedestrian 80 or the vehicle. The risk area may be, for example, an area where it is necessary to perform a safety check for the pedestrian 80 or the vehicle.

It should be noted that according to the present embodiment, for ease of the description, a case will be considered where it is determined on whether a pedestrian is present in the risk area. The pedestrian refers to a person who can make a passage on a road by a method without relaying on a vehicle. The pedestrian includes a person who makes a passage on a road using a wheel chair or the like. However, it may be determined on whether not only the pedestrian but also any movable object such as a person other than the pedestrian or another vehicle is present in the risk area. The person other than the pedestrian may include a person aboard a stopped vehicle.

Figure 3:
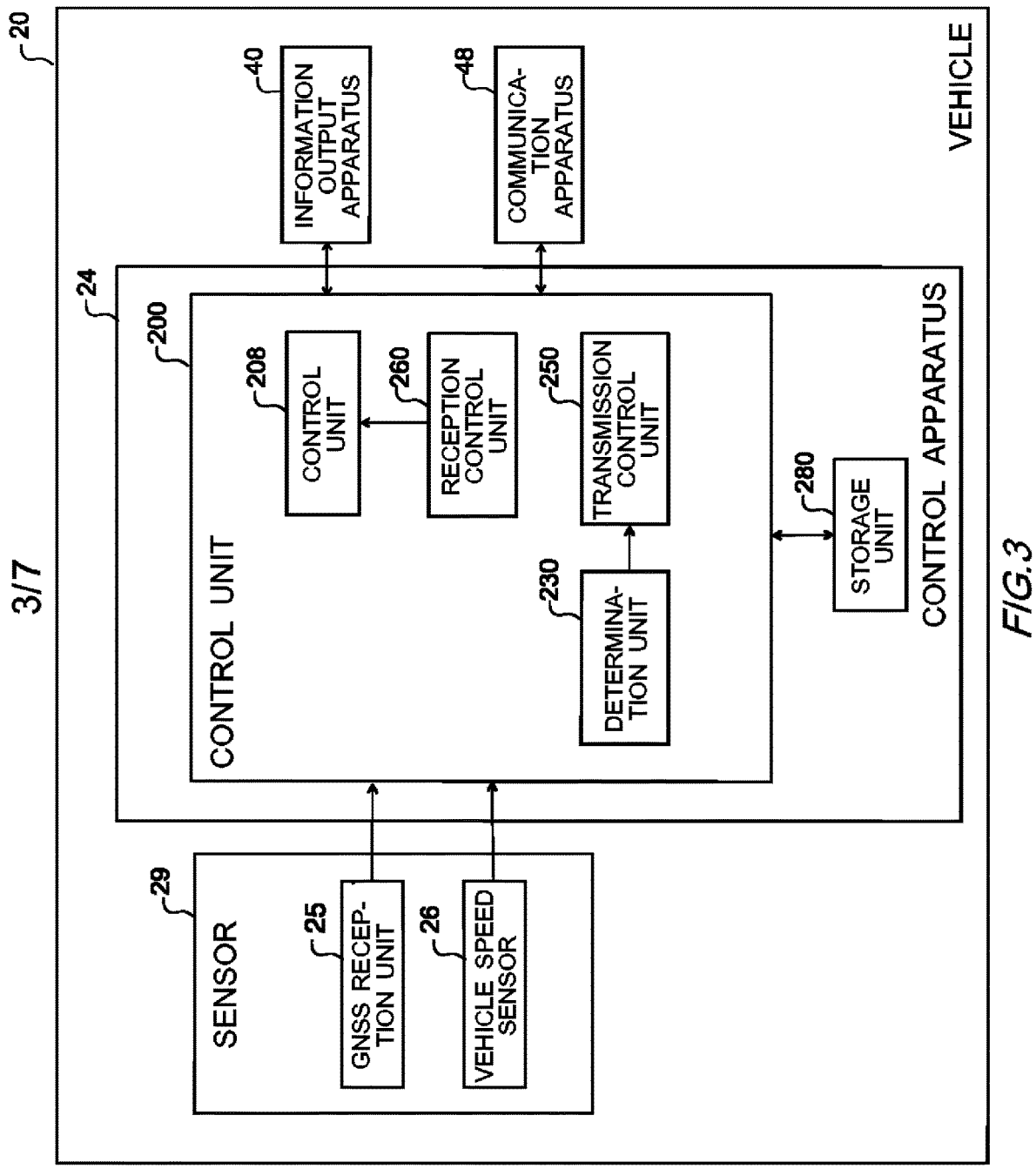
FIG. 3 illustrates a system configuration of the vehicle 20.

FIG. 3 illustrates a system configuration of the vehicle 20. The vehicle 20 includes a sensor 29, the control apparatus 24, a communication apparatus 48, and an information output apparatus 40.

The sensor 29 includes a GNSS reception unit 25 and a vehicle speed sensor 26. The GNSS reception unit 25 is configured to receive radio waves emitted from a global navigation satellite system (GNSS) satellite. The GNSS reception unit 25 generates information indicating a current position of the vehicle 20 based on a signal received from the GNSS satellite. The vehicle speed sensor 26 is configured to detect a vehicle speed of the vehicle 20.

The communication apparatus 48 is responsible for communication between the terminal 82 and the server 52. The communication apparatus 48 may perform wireless communication by LTE-V2X PC5 with the terminal 82.

The information output apparatus 40 is an apparatus configured to output warning information. The information output apparatus 40 may have an HMI function. The information output apparatus 40 may include a head-up display or a navigation system. The information output apparatus 40 may also be a mobile terminal possessed by an occupant of the vehicle 20. The information output apparatus 40 may include a sound output apparatus configured to output the warning information by a sound.

The control apparatus 24 includes a control unit 200 and a storage unit 280. The control unit 200 is realized by a circuit such as an arithmetic processing apparatus including, for example, a processor. The storage unit 280 is realized by including a nonvolatile storage medium. The control unit 200 is configured to perform processing by using information stored in the storage unit 280. The control unit 200 may be realized by an electronic control unit (ECU) including a microcomputer provided with a CPU, a ROM, a RAM, an I/O, a bus, and the like.

The control unit 200 includes a determination unit 230, a control unit 208, a transmission control unit 250, and a reception control unit 260. The transmission control unit 250 and the reception control unit 260 are configured to control communication between the terminal 82 and the server 52 by controlling the communication apparatus 48. It should be noted that a mode may be adopted in which the control unit 200 does not have a part of functions in a functional block illustrated in FIG. 3. For example, a mode may be adopted in which only a part of functions is implemented in the control unit 200, and the other function is implemented as a function of the sensor 29 or the other circuit.

When the vehicle 20 is located at a first point, the reception control unit 260 performs control to receive presence information of the risk area including a plurality of position coordinates specified through image recognition by the other vehicle 20. The reception control unit 260 may receive the presence information transmitted by broadcasting from the other vehicle 20. The reception control unit 260 may perform control to receive the presence information of the risk area from a server configured to manage the presence information of the risk area specified through image recognition by a plurality of other vehicles.

The plurality of position coordinates of the risk area may include a plurality of latitude and longitude coordinates of the risk area. The plurality of pieces of position coordinates may be coordinate information representing a geographical position of the risk area. When the risk area is polygonal, the plurality of position coordinates may be coordinate information of vertices of a polygon. The position coordinates of the risk area may include one piece of coordinate information and information of a distance from a position indicated by the coordinate information. For example, the position coordinates of the risk area may include position coordinates of a specific point of the risk area, and distance information representing a size of the risk area while the above described point is set as a reference.

The determination unit 230 is configured to determine whether the vehicle 20 is in the vicinity of the risk area based on a plurality of position coordinates included in the presence information of the risk area for which the reception control unit 260 has performed the control to receive. The determination unit 230 may determine whether the vehicle 20 is in the vicinity of the risk area by determining whether the vehicle 20 is to reach a position of the risk area within a predetermined time period based on the position coordinates of the risk area, the current position of the vehicle 20 which is generated by the GNSS reception unit 25, and a vehicle speed of the vehicle 20 which is detected by the vehicle speed sensor 26.

When the determination unit 230 determines that the vehicle 20 is in the vicinity of the risk area, the transmission control unit 250 performs the control to transmit information related to the presence of the vehicle 20. To be specific, in a case where the vehicle 20 is located at a second point that is closer to the risk area than the first point, the transmission control unit 250 performs control to transmit, to an outside of the vehicle 20, risk area information for requesting information related to the risk area based on the presence information of the risk area for which the reception control unit 260 has performed the control to receive. The second point may be a point in front of the risk area by less than a predetermined distance along a moving direction of the vehicle 20.

The transmission control unit 250 performs control to include a plurality of position coordinates of the risk area in the risk area information, and transmit the risk area information without designating a destination. It should be noted that the transmission control unit 250 may cause the risk area information to be transmitted by broadcast. It should be noted that according to the present embodiment, "transmission to the outside of the vehicle 20" under the control of the transmission control unit 250 may be transmission by broadcast to a surrounding communication device without designating a destination. "Transmission to the outside of the vehicle 20" may be transmission to be performed in a manner that a communication device outside the vehicle 20 can receive transmitted information irrespective of whether the transmitted information can be received by the communication device in the vehicle 20.

The control unit 208 is configured to execute control of the vehicle 20 based on response information to the risk area information from an external apparatus. Thus, the control unit 208 executes the control of the vehicle 20 based on the response information. Herein, the external apparatus may be the terminal 82. As will be described below, the external apparatus may be the server 52 configured to manage current position information of the terminal 82.

The control unit 208 may execute driver assistance of the vehicle 20 or an alert for an occupant of the vehicle 20 based on the response information. For example, when the information output apparatus 40 includes a head-up display, the control unit 208 may cause the head-up display of the vehicle 20 to output light for forming a mark as warning information indicating that a pedestrian is present in the risk area. In addition, the control unit 208 may cause the head-up display to output light for forming a mark in a display region corresponding to a position of the risk area where the pedestrian is present. The control unit 208 may project the light for forming a mark towards a reflective part provided to a windshield of the vehicle 20. It should be noted that the control unit 208 may output the warning information by a sound or a character. In addition, the control unit 208 may control the travelling of the vehicle 20 through the ECU included in the vehicle 20.

The presence information of the risk area may include information indicating a valid period of the risk area. The transmission control unit 250 may perform control to transmit the risk area information to the outside of the vehicle 20 under a condition of being within the valid period of the risk area. For example, the vehicle 60 may perform the transmission by including the presence information of the risk area.

The presence information of the risk area may include information indicating a moving direction of the other vehicle 60 that has specified the risk area. The transmission control unit 250 may perform the control to transmit the risk area information to the outside of the vehicle 20 under a condition that a moving direction of the vehicle 20 is matched with a moving direction of the other vehicle 60 that has recognized the risk area.

The vehicle 20 does not include an image recognition apparatus configured to recognize an image in the moving direction of the vehicle 20. It should be noted that according to the present embodiment, the vehicle 20 does not include an image recognition apparatus. However, the vehicle 20 may include the image recognition apparatus configured to recognize the image in the moving direction of the vehicle 20. In addition, when the presence information of the risk area is received, a configuration may be adopted where the transmission control unit 250 does not transmit response information to the presence information of the risk area.

It should be noted that when the server 52 manages current position information of one or more terminals, the transmission control unit 250 may transmit the risk area information to the server 52. The reception control unit 260 may perform control to receive, from the server 52, response information including current position information of the terminal 82 present in the risk area or within a predetermined range from the risk area as the response information to the risk area information.

Figure 4:
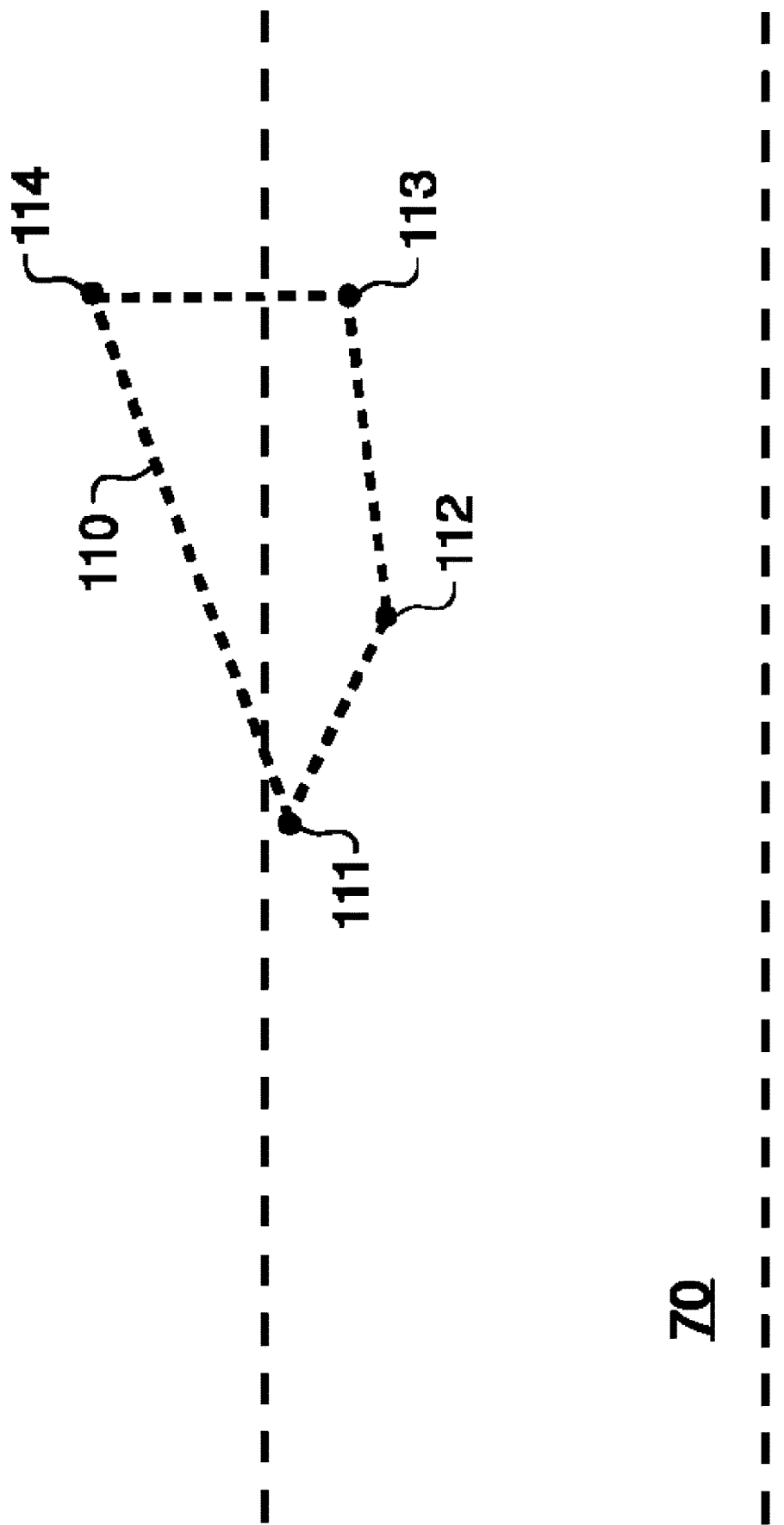
FIG. 4 conceptually illustrates position information of a risk area.

FIG. 4 conceptually illustrates position information of the risk area. FIG. 4 illustrates a case where the risk area is represented as a polygon.

The control apparatus 64 calculates coordinates of each of four points including a point 111, a point 112, a point 113, and a point 114 which represent a contour of the area 110 as the position information of the risk area. The area 110 is a closed region formed by linking the coordinates of the point 111, the point 112, the point 113, and the point 114. The control apparatus 64 stores the coordinates of each of the point 111, the point 112, the point 113, and the point 114 in association with an area ID assigned to the area 110. The control apparatus 64 transmits presence information including the area ID and the coordinates indicating the area 110.

When the terminal 82 receives the presence information, the terminal 82 determines whether a current position of the terminal 82 is included in an area surrounded by the four points indicated by the coordinates included in the presence information. When the current position of the terminal 82 is included in the area surrounded by the four points, the terminal 82 transmits response information including the area ID of the risk area where the terminal 82 is present to the vehicle 60 corresponding to a transmission source of the presence information.

In the vehicle 20, when the control apparatus 24 receives the presence information transmitted from the control apparatus 64, the control apparatus 24 stores coordinates of each of the point 111, the point 112, the point 113, and the point 114 in association with the area ID decided by the control apparatus 24. In a case where a distance between a closest point in the advancing direction of the vehicle 20 among the point 111, the point 112, the point 113, and the point 114 and the current position of the vehicle 20 is less than a predetermined distance, the control apparatus 24 transmits risk area information including the coordinates of each of the point 111, the point 112, the point 113, and the point 114 and the area ID.

When the terminal 82 receives the risk area information, similarly as in a case where the presence information is received, the terminal 82 determines whether the current position of the terminal 82 is included in the area surrounded by the four points indicated by the coordinates included in the risk area information. When the current position of the terminal 82 is included in the area surrounded by the four points, the terminal 82 transmits the response information including the area ID of the risk area where the terminal 82 is present to the vehicle 20 corresponding to a transmission source of the risk area information.

It should be noted that when the risk area is circular, the position information of the risk area may include coordinate information of a central point of the risk area and diameter information of the risk area. When the risk area is elliptical, the position information of the risk area may include coordinate information of a central point of the risk area and major axis, minor axis, and azimuth angle information. When the risk area is polygonal, the position information of the risk area may include coordinate information of a point corresponding to a reference of a polygon and length information of sides such as a width and a height of the risk area.

Figure 5:
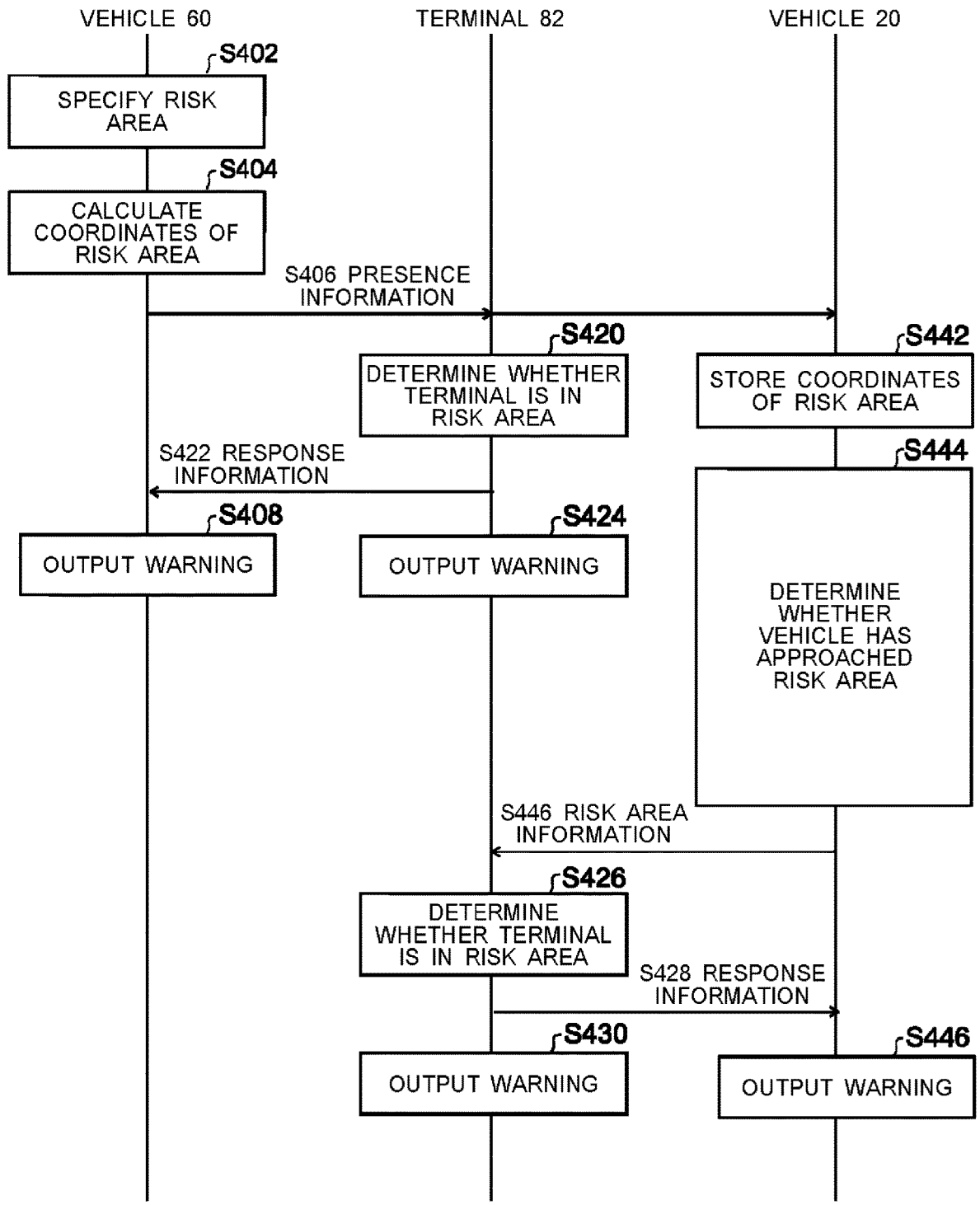
FIG. 5 schematically illustrates a processing flow related to a control method executed in a vehicle 60, the vehicle 20, and a terminal 82.

FIG. 5 schematically illustrates a processing flow related to a control method executed in the vehicle 60, the vehicle 20, and the terminal 82.

In S402, the control apparatus 64 of the vehicle 60 specifies a risk area from an image picked up by the camera included in the sensor 69. For example, an area that is not on a line of sight in the advancing direction of the vehicle 60 is specified as the risk area. To be specific, the control apparatus 64 may judge the area that is not on the line of sight by recognizing a target object from the image picked up by the camera mounted to the vehicle 60. The target object is, for example, another vehicle, a construction such as a building, a street tree, or the like. The area that is not on the line of sight when viewed from a position of the vehicle 60 is, for example, position information of an area where an occlusion occurs through shielding by a three-dimensional object such as another vehicle, a construction, or a street tree. The control apparatus 64 may specify the area that is not on the line of sight based on the image information and map information.

In S404, the control apparatus 64 calculates coordinates of the risk area. The control apparatus 64 calculates the coordinates of the risk area based on the current position of the vehicle 60, the traveling direction of the vehicle 60, and a distance to the other vehicle 90 which is measured by the sensor 69.

In S406, the control apparatus 64 transmits the presence information of the risk area through the communication apparatus 48. The presence information may include the area ID, coordinate information of the risk area, transmission source information of the presence information, the valid period of the risk area, direction information indicating the traveling direction of the vehicle 60, and the current position information of the vehicle 60. The area ID is identification information for uniquely specifying the risk area specified in S402. The area ID may be identification information to be decided by the control apparatus 64. The transmission source information is identification information for uniquely specifying the vehicle 60 corresponding to a transmission source of the presence information.

When the terminal 82 receives the presence information transmitted from the vehicle 60, the terminal 82 determines whether the current position of the terminal 82 is in the risk area represented by the coordinates included in the risk area information (S420). When the current position of the terminal 82 is in the risk area, in S422, the terminal 82 transmits response information indicating that a pedestrian is present in the risk area to the vehicle 60. In addition, in S424, the terminal 82 performs a warning output for the pedestrian 80. In S408, the control apparatus 64 of the vehicle 60 performs a warning output when the response information received from the terminal 82 indicates the presence of the pedestrian in the risk area.

In the vehicle 20, when the reception control unit 260 receives the presence information transmitted from the control apparatus 64 in S406, the reception control unit 260 stores the coordinates of the risk area which are included in the presence information, the valid period, direction information of the vehicle 60, and current position information of the vehicle 60 in the storage unit 280 (S442). In S444, the determination unit 230 continually determines whether the vehicle 20 has approached the risk area based on the coordinates of the risk area which are stored by the storage unit 280. When the determination unit 230 determines that the vehicle 20 has approached the risk area, the transmission control unit 250 causes the risk area information including the coordinates of the risk area which are stored by the storage unit 280 to be transmitted (S446).

It should be noted that the transmission control unit 250 may cause the risk area information to be transmitted under a condition that a current clock time is within the valid period of the risk area. The transmission control unit 250 may cause the risk area information to be transmitted under a condition that an angle defined by the traveling direction of the vehicle 60 which is stored in the storage unit 280 and a current traveling direction of the vehicle 20 is within a predetermined angle. The transmission control unit 250 may cause the risk area information to be transmitted under a condition that a distance between the current position information of the vehicle 60 which is stored in the storage unit 280 and the current position information of the vehicle 20 is within a predetermined distance.

When the terminal 82 receives the risk area information transmitted from the vehicle 20, the terminal 82 determines whether the current position of the terminal 82 is in the risk area represented by the coordinates included in the risk area information (S426). When the current position of the terminal 82 is in the risk area, in S428, the terminal 82 transmits response information indicating the presence of the pedestrian in the risk area to the vehicle 20. In addition, in S430, the terminal 82 performs a warning output for the pedestrian 80. In S446, when the response information received from the terminal 82 indicates the presence of the pedestrian in the risk area, the control unit 208 of the vehicle 20 performs the warning output through the information output apparatus 40.

Figure 6:
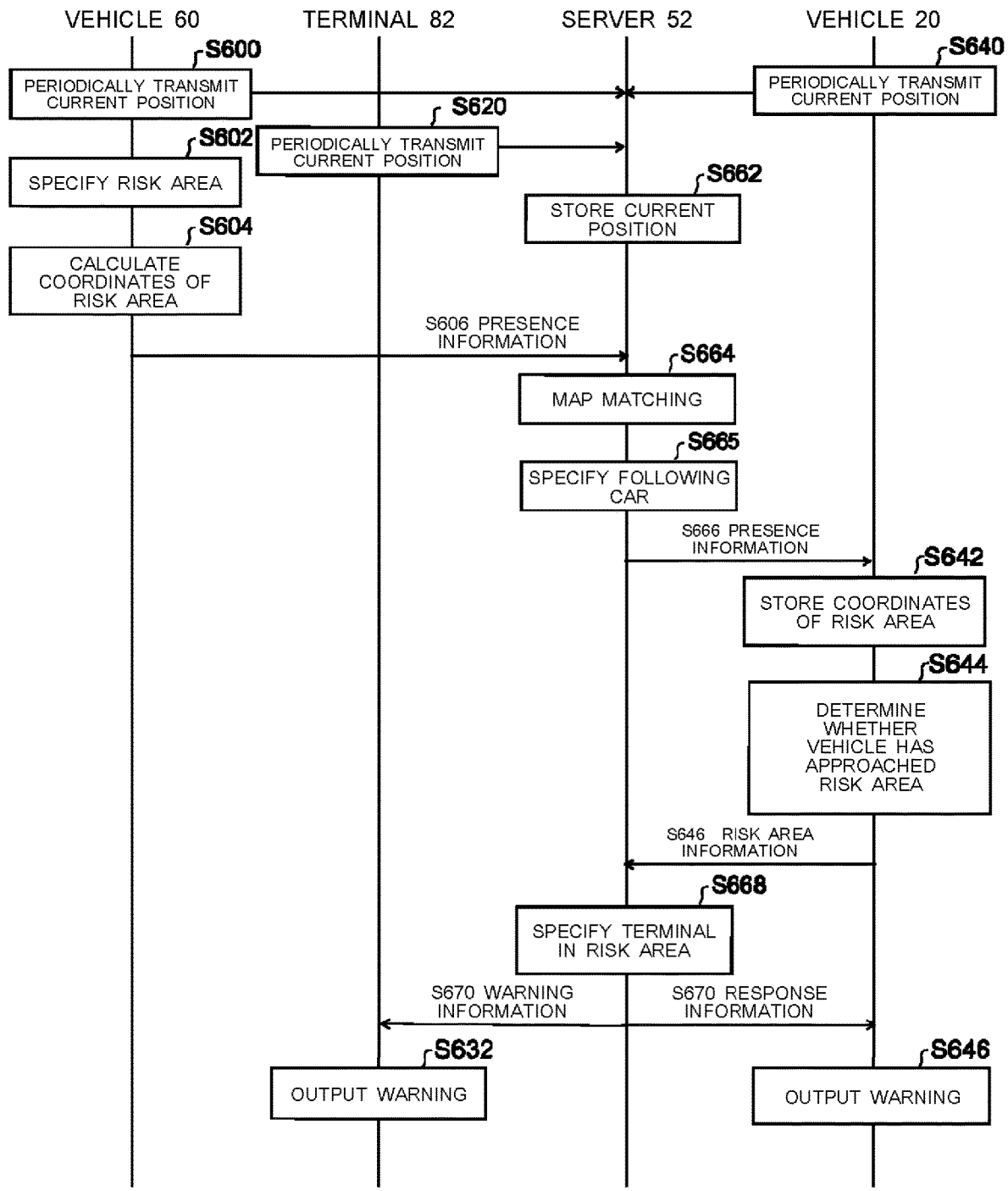
FIG. 6 schematically illustrates a flow of processing related to a control method in another mode which is executed by the vehicle 60, the vehicle 20, a server 52, and the terminal 82.

FIG. 6 schematically illustrates a flow of processing related to a control method in another mode which is executed by the vehicle 60, the vehicle 20, the server 52, and the terminal 82. FIG. 6 illustrates a flow of processing in a mode where the server 52 manages the risk area.

In S600, the control apparatus 64 periodically transmits a current position of the vehicle 60 to the server 52. In addition, in S640, the transmission control unit 250 of the control apparatus 24 periodically transmits a current position of the vehicle 20 to the server 52. In S620, the terminal 82 periodically transmits a current position of the terminal 82 to the server 52. In S662, the server 52 stores position information of the vehicle 60, the vehicle 20, and the terminal 82.

In S602, the control apparatus 64 of the vehicle 60 specifies the risk area from the image picked up by the camera included in the sensor 69. The control apparatus 64 calculates coordinates of the risk area in S604. The processing in S602 and the processing in S604 are respectively similar to the processing in S402 and the processing in S404.

In S606, the control apparatus 64 transmits the presence information of the risk area through the communication apparatus 48. As described in relation to FIG. 5, the presence information may include the area ID, the coordinates of the risk area, the transmission source information of the presence information, the valid period of the risk area, the direction information indicating the traveling direction of the vehicle 60, and the current position information of the vehicle 60.

In S664, when the server 52 receives the presence information transmitted from the control apparatus 64, the server 52 performs map matching by using the position information of the vehicle 20 and the position information of the vehicle 60 which are stored in S662 and the coordinates of the risk area included in the presence information, and specifies positions of the vehicle 20 on a map and the vehicle 60 and coordinates of the risk area. Subsequently, in S665, the server 52 specifies a following vehicle of the vehicle 60 based on a result of the map matching and the presence information. For example, the server 52 specifies, among vehicles travelling on a link where the vehicle 60 has travelled when the vehicle 60 has transmitted the presence information, a vehicle travelling in a same direction as the vehicle 60 along the link behind the vehicle 60 as the following vehicle of the vehicle 60. When the server 52 specifies the vehicle 20 as the following vehicle in S665, the server 52 transmits the presence information of the risk area to the vehicle 20 in S666. The presence information of the risk area may include the coordinates of the risk area, the valid period, the direction information of the vehicle 60, and the current position information of the vehicle 60 when the vehicle 60 specifies the risk area.

In the vehicle 20, when the reception control unit 260 receives the presence information transmitted from the server 52 in S666, the reception control unit 260 stores the coordinates of the risk area included in the presence information, the valid period, the direction information of the vehicle 60, and the current position information of the vehicle 60 in the storage unit 280 (S642). In S644, the determination unit 230 continually determines whether the vehicle 20 has approached the risk area based on the coordinates of the risk area which are stored by the storage unit 280. When the determination unit 230 determines that the vehicle 20 has approached the risk area, the transmission control unit 250 transmits the risk area information including the coordinates of the risk area which are stored by the storage unit 280 (S646).

It should be noted that the transmission control unit 250 may cause the risk area information to be transmitted under a condition that the current clock time is within the valid period of the risk area. The transmission control unit 250 may cause the risk area information to be transmitted under a condition that an angle defined by the traveling direction of the vehicle 60 which is stored in the storage unit 280 and a current traveling direction of the vehicle 20 is within a predetermined angle. The transmission control unit 250 may cause the risk area information to be transmitted under a condition that a distance between the current position information of the vehicle 60 which is stored in the storage unit 280 and the current position information of the vehicle 20 is within a predetermined distance.

When the server 52 receives the risk area information transmitted from the vehicle 20, the server 52 specifies the terminal 82 present in the risk area represented by the coordinates included in the risk area information based on the current position of the terminal 82 managed by the server 52 and the risk area information (S668). In S670, the server 52 transmits the warning information to the terminal 82 specified in S668 and also transmits the response information indicating the presence of the pedestrian in the risk area to the vehicle 20. In S646, when the control unit 208 of the vehicle 20 receives the response information from the server 52, the control unit 208 performs the warning output through the information output apparatus 40. In addition, in S632, the terminal 82 performs the warning output when the warning information is received from the server 52.

It should be noted that in S646, the transmission control unit 250 may transmit the risk area information by broadcast without designating a destination as described in relation to S446 in FIG. 5. In this case, as described in relation to S426, S428, S430, and S446 in FIG. 5, when the risk area information is received, the terminal 82 determines whether the current position of the terminal 82 is in the risk area, and in a case where it is determined that the current position of the terminal 82 is in the risk area, the terminal 82 may transmit the response information to the vehicle 20. In this case, the control unit 208 of the vehicle 20 may perform the warning output when response information is received from at least one of the server 52 or the terminal 82. In addition, when it is determined that the current position of the terminal 82 is in the risk area, the terminal 82 may perform the warning output.

In addition, the control apparatus 64 of the vehicle 60 may transmit the presence information by broadcast without designating a destination in S606. In this case, as described in relation to S420, S422, S408, and S424 in FIG. 5, when the presence information is received, the terminal 82 determines whether the current position of the terminal 82 is in the risk area, and in a case where it is determined that the current position of the terminal 82 is in the risk area, the terminal 82 may transmit response information to the vehicle 60. In this case, the control apparatus 64 may perform the warning output when the response information is received from the terminal 82. In addition, the terminal 82 may perform the warning output in a case where it is determined that the current position of the terminal 82 is in the risk area.

In addition, in a case where the presence information of the risk area is received in S606, after the map matching is performed in S664, the server 52 may specify the terminal 82 present in the risk area and transmit the warning information to the specified terminal 82, and also transmit the response information indicating the presence of the pedestrian in the risk area to the vehicle 60. In this case, the control apparatus 64 of the vehicle 60 may perform the warning output when the response information is received from the server 52, and the terminal 82 may perform the warning output when the warning information is received from the server 52.

It should be noted that the configuration has been described where the server 52 obtains the presence information of the risk area from the vehicle 60 in relation to FIG.

6, but the server 52 may obtain the presence information of the risk area from not only the vehicle 60 but also any of a plurality of vehicles travelling in any direction. In addition, the server 52 may store coordinate information of a predetermined fixed risk area corresponding to an area that is not on the line of sight due to a fixed three-dimensional object such as a construction or a street tree, and transmit the presence information of the risk area to a vehicle travelling towards the risk area.

As described above, in accordance with the warning system 10, the control apparatus 24 can store the position information of the risk area which is received from the other vehicle 60 or the server 52, and transmit the risk area information when the vehicle 20 has reached a position close to the risk area. With this configuration, as long as the control apparatus 24 has the wireless communication function, the control apparatus 24 can output the warning to the terminal 82 or perform the travelling assistance of the vehicle 20 without having a function of recognizing the risk area by sensing means such as a camera. In addition, in a case where the pedestrian 80 walking in a dangerous position is present at timing at which the vehicle 20 has reached a position close to the risk area, the terminal 82 of the pedestrian 80 can be caused to perform the warning output, and also the travelling assistance of the vehicle 20 can be performed.

It should be noted that communication between the control apparatus 24 and the control apparatus 64 and the terminal 82 may be performed by short distance direct communication in Cellular-V2X. Examples of the short distance direct communication in Cellular-V2X include communication standards such as LTE-V2X PC5 and 5G-V2X PC5. A mode using Wi-Fi (registered trademark) or dedicated short range communications (DSRC) may be adopted as the direct communication. The control apparatus 24 and the control apparatus 64 may perform the direct communication with the terminal 82 via a base transceiver station. In addition to Cellular-V2X or DSRC (registered trademark), any direct communication standard such as Bluetooth (registered trademark) may be adopted in the communication between the control apparatus 24 and the control apparatus 64 and the terminal 82. The control apparatus 24 and the control apparatus 64 may perform the direct communication with the terminal 82 by using communication infrastructure included in intelligent transport systems (ITS).

It should be noted that the vehicle 20 and the vehicle 60 are one example of transport equipment. The transport equipment includes a motor vehicle such as a passenger vehicle or a bus, a riding saddle riding type vehicle, a bicycle, or the like. In addition, the movable object corresponding to a recognition target by the vehicle 20 includes, in addition to a person, transport equipment such as a motor vehicle like a passenger vehicle or a bus, a saddle riding type vehicle, or a bicycle.

Figure 7:
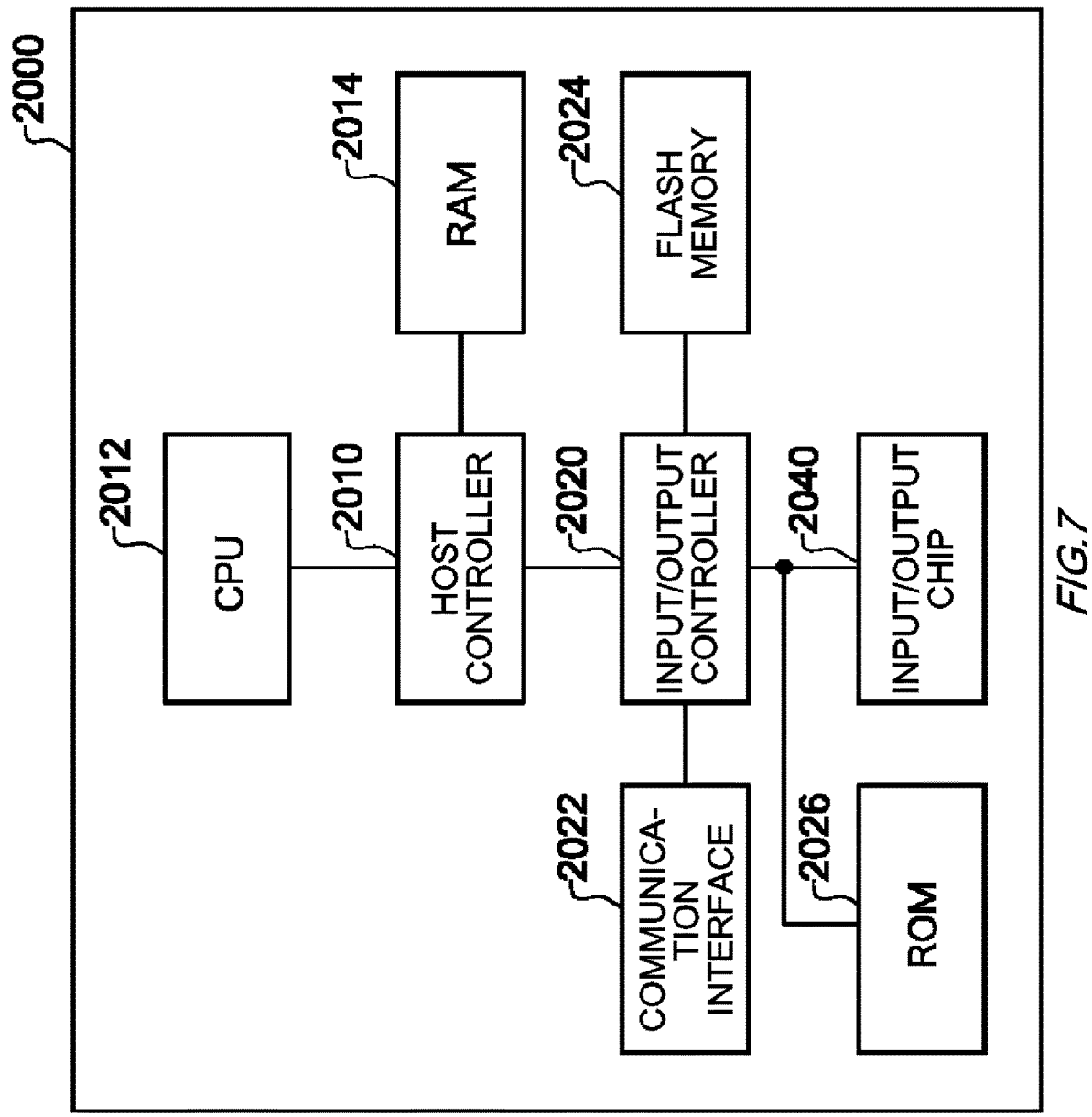
FIG. 7 illustrates an example of a computer 2000.

FIG. 7 illustrates an example of a computer 2000 where a plurality of embodiments of the present invention may be entirely or partially embodied. Programs installed in the computer 2000 can cause the computer 2000 to: function as apparatuses such as the control apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, or an HDMI (registered trademark) port.

The programs are provided via a network or a computer readable medium such as a CD-ROM, a DVD-ROM, or a memory card. The RAM 2014, the ROM 2026, or the flash memory 2024 is an example of the computer readable medium. The programs are installed in the flash memory 2024, the RAM 2014, or the ROM 2026, and are executed by the CPU 2012. Information processing written in these programs is read by the computer 2000, and provides cooperation between the programs and the various types of hardware resources described above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs to write back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of the plurality of entries described above, an entry with the attribute value of the first attribute specified that meets a condition, read the attribute value of the second attribute stored in above described entry, and thereby acquire the attribute value of the second attribute associated with the first attribute meeting a predetermined condition.

The programs or software module described above may be stored on the computer 2000 or in a computer readable medium near the computer 2000. A recording medium such as a hard disk or RAM provided in a server system connected to a dedicated communication network or the Internet can be used as the computer readable medium. The programs stored in the computer readable medium may be provided to the computer 2000 via the network.

The program that is installed in the computer 2000 and causes the computer 2000 to function as the control unit 200 may instruct the CPU 2012 or the like to cause the computer 2000 to function as each unit of the control unit 200. The information processing written in these programs are read by the computer 2000 to cause the computer to function as each unit of the control unit 200, which is specific means realized by the cooperation of software and the various types of hardware resources described above. Then, these specific means implement operations or processing of information according to the intended use of the computer 2000 in the present embodiment, so that the control device 200 is constructed as a specific control unit according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable medium, and/or a processor supplied along with the computer readable instruction stored on the computer readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer readable medium may include any tangible device capable of storing an instruction executed by an appropriate device, so that the computer readable medium having the instruction stored thereon constitutes at least a part of a product including an instruction that may be executed in order to provide means to execute an operation specified by a processing procedure or a block diagram. Examples of the computer readable media may include an electronic storage medium, a magnetic storage medium, an optical storage medium, an electromagnetic storage medium, a semiconductor storage medium, or the like. More specific examples of the computer readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include either source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 warning system
20, 60, 90 vehicle
24 control apparatus
25 GNSS reception unit
26 vehicle speed sensor
29 sensor
40 information output apparatus
48 communication apparatus
50 base transceiver station
52 server
64 control apparatus
69 sensor
70 road 80 pedestrian
82 terminal
110 area
111, 112, 113, 114 point
200 control unit
208 control unit
230 determination unit
250 transmission control unit
260 reception control unit
280 storage unit
2000 computer
2010 host controller
2012 CPU
2014 RAM
2020 input/output controller
2022 communication interface
2024 flash memory
2026 ROM
2040 input/output chip

What is claimed is:

1. A control apparatus comprising:
at least one processor, wherein
the at least one processor is configured to perform control to receive from another movable object, when a movable object is located at a first point, presence information of a risk area including a plurality of position coordinates of the risk area, the plurality of position coordinates being specified through image recognition by the another movable object;
determine whether the movable object is in a vicinity of the risk area based on the plurality of position coordinates included in the presence information of the risk area for which the control to receive has been performed;
perform control to transmit, when it is determined that the movable object is in the vicinity of the risk area, information related to presence of the movable object; and
execute control of the movable object, wherein
when the movable object is located at a second point that is closer to the risk area than the first point, the at least one processor is further configured to control to transmit, to an outside of the movable object, risk area information for requesting information related to the risk area based on the presence information of the risk area for the control to receive has been performed, and
execute the control of the movable object based on response information from an external apparatus to the risk area information.

2. The control apparatus according to claim 1, wherein the presence information of the risk area includes information indicating a valid period of the risk area, and the at least one processor is further configured to
perform the control to transmit the risk area information to the outside of the movable object under a condition of being within the valid period of the risk area.

3. The control apparatus according to claim 2, wherein the presence information of the risk area includes information indicating a moving direction of the other movable object that has specified the risk area, and the at least one processor is further configured to
perform the control to transmit the risk area information to the outside of the movable object under a condition that a moving direction of the movable object is matched with the moving direction of the other movable object that has recognized the risk area.

4. The control apparatus according to claim 2, wherein the second point is a point in front of the risk area by less than a predetermined distance along a moving direction of the movable object.

5. The control apparatus according to claim 2, wherein the at least one processor is further configured to execute driver assistance of the movable object or an alert for an occupant of the movable object.

6. The control apparatus according to claim 2, wherein the at least one processor is further configured to perform the control to include a plurality of position coordinates of the risk area in the risk area information, and transmit the risk area information without designating a destination.

7. The control apparatus according to claim 2, wherein the at least one processor is further configured to perform control to receive the presence information of the risk area from a server configured to manage the presence information of the risk area specified through image recognition by a plurality of other movable objects.

8. The control apparatus according to claim 1, wherein the presence information of the risk area includes information indicating a moving direction of the other movable object that has specified the risk area, and the at least one processor is further configured to
perform the control to transmit the risk area information to the outside of the movable object under a condition that a moving direction of the movable object is matched with the moving direction of the other movable object that has recognized the risk area.

9. The control apparatus according to claim 8, wherein the second point is a point in front of the risk area by less than a predetermined distance along a moving direction of the movable object.

10. The control apparatus according to claim 1, wherein the second point is a point in front of the risk area by less than a predetermined distance along a moving direction of the movable object.

11. The control apparatus according to claim 1, wherein the at least one processor is further configured to execute driver assistance of the movable object or an alert for an occupant of the movable object.

12. The control apparatus according to claim 1, wherein the at least one processor is further configured to perform the control to include a plurality of position coordinates of the risk area in the risk area information, and transmit the risk area information without designating a destination.

13. The control apparatus according to claim 1, wherein the at least one processor is further configured to perform control to receive the presence information of the risk area from a server configured to manage the presence information of the risk area specified through image recognition by a plurality of other movable objects.

14. The control apparatus according to claim 13, wherein the server is configured to manage current position information of one or more terminals, and the at least one processor is further configured to
transmit the risk area information to the server, and
perform the control to receive, from the server, response information including current position information of a terminal present in the risk area or within a predetermined range from the risk area as response information to the risk area information.

15. The control apparatus according to claim 1, wherein the movable object does not include a camera configured to recognize an image in a moving direction of the movable object.

16. The control apparatus according to claim 1, wherein when receiving the presence information of the risk area, the at least one processor is further configured not to transmit response information to the presence information of the risk area.

17. The control apparatus according to claim 1, wherein the movable object is a vehicle.

18. A movable object comprising the control apparatus according to claim 1.

19. A control method comprising:
- performing control to receive from another movable object, when a movable object is located at a first point, presence information of a risk area including a plurality of position coordinates of the risk area, the plurality of position coordinates being specified through image recognition by the another movable object;
- determining whether the movable object is in a vicinity of the risk area based on the plurality of position coordinates included in the presence information of the risk area;
- performing control to transmit, when it is determined that the movable object is in the vicinity of the risk area, information related to presence of the movable object; and
- executing control of the movable object, wherein
- when the movable object is located at a second point that is closer to the risk area than the first point, the performing the control to transmit the information related to the presence of the movable object includes performing control to transmit, to an outside of the movable object, risk area information for requesting information related to the risk area based on the presence information of the risk area, and
- the executing the control of the movable object includes executing the control of the movable object based on response information from an external apparatus to the risk area information.

20. A non-transitory computer readable storage medium having stored thereon a program, the program causing a computer to execute:
- performing control to receive from another movable object, when a movable object is located at a first point, presence information of a risk area including a plurality of position coordinates of the risk area, the plurality of position coordinates being specified through image recognition by the another movable object;
- determining whether the movable object is in a vicinity of the risk area based on the plurality of position coordinates included in the presence information of the risk area;
- performing control to transmit, when it is determined that the movable object is in the vicinity of the risk area, information related to presence of the movable object; and
- executing control of the movable object, wherein
- when the movable object is located at a second point that is closer to the risk area than the first point, the performing the control to transmit the information related to the presence of the movable object includes performing control to transmit, to an outside of the movable object, risk area information for requesting information related to the risk area based on the presence information of the risk area, and
- the executing the control of the movable object includes executing the control of the movable object based on response information from an external apparatus to the risk area information.

* * * * *